UNITED STATES PATENT OFFICE.

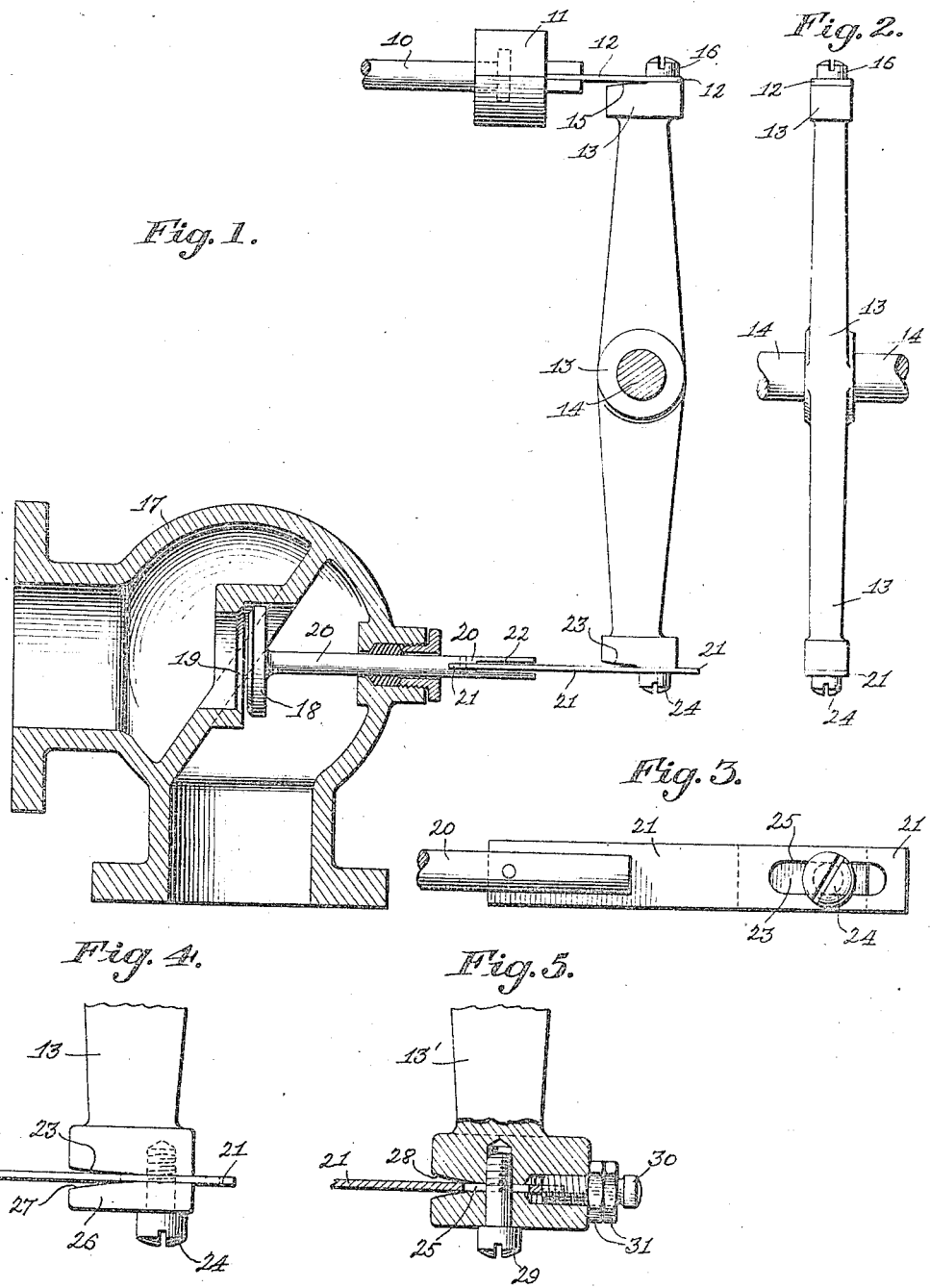

ELMER D. SPICER, OF WELLSVILLE, NEW YORK, ASSIGNOR TO MOORE STEAM TURBINE COMPANY, OF WELLSVILLE, NEW YORK, A CORPORATION OF NEW YORK.

GOVERNOR-VALVE CONNECTION.

1,232,728.  Specification of Letters Patent.  Patented July 10, 1917.

Application filed October 31, 1916. Serial No. 128,734.

*To all whom it may concern:*

Be it known that I, ELMER D. SPICER, a citizen of the United States, residing at Wellsville, in the county of Allegany and State of New York, have invented certain new and useful Improvements in Governor-Valve Connections, of which the following is a specification.

My invention relates to governing mechanism and more particularly to the connections between a controlling member, such as a governor spindle, and a throttle valve, the invention being especially adapted for steam turbines.

The primary object of the invention is to provide means for connecting a governor spindle, having a rectilinear governing movement, with one arm of a rocker, and the other arm of the rocker with a throttle valve, having rectilinear movement, the said connecting means being adjustable, having no wearing parts and being capable of accurately transmitting the movements of the spindle to the valve.

Other objects and advantages of the invention will appear from the detailed description and mode of operation.

The invention consists of structural features and relative arrangements of the several elements which will be hereinafter more fully described and particularly pointed out in the appended claims.

In the drawings, in which similar reference characters indicate the same parts in the several figures of drawing:

Figure 1 is a view, partly in section and partly in elevation, of a governing mechanism showing my invention applied thereto;

Fig. 2 is a side view of parts shown in Fig. 1;

Fig. 3 is an enlarged bottom plan view of parts shown in Fig. 1;

Fig. 4, is an enlarged fragment of Fig. 1 but showing a modification; and

Fig. 5 is a view similar to Fig. 4 but showing another modification, certain parts being in section.

Referring to the drawings 10, indicates the spindle of a governor and which, if of the rotating type, carries a non-rotating head 11 to which a spring bar 12, shown as a leaf spring, is rigidly secured so as to move endwise with the head. The spring bar 12 is non-flexible lengthwise but is flexible laterally, or up and down as it appears in Fig. 1.

A rocker 13 mounted on a shaft or pivot 14 has, at its upper end an arcuate surface 15 formed about the axis of the shaft 14. The end of the spring bar 12 is rigidly clamped against the surface 15 by means of the screw 16.

A throttle valve body is shown in section at 17 and has arranged therein the valve 18 having a rectilinear movement to and from the seat 19 to control the flow of motive fluid. The stem 20 has rigidly secured thereto, so as to move endwise therewith, a spring bar 21 which is laterally flexible but longitudinally non-flexible. It will be observed that the bar 21 is in the form of a leaf spring and is carried in a slot in the end of the stem 20, the slot being widened at 22 to allow for the flexing of the bar 21. The lower end of the rocker 13 has an arcuate surface 23 formed about the axis of the shaft 14 and against which the end of the bar 21 is rigidly clamped by means of the screw 24. As shown in Fig. 3 the bar 21 has an elongated slot 25 for the screw 24, this slot permitting the bar to be adjusted relatively to the rocker 13, and thereby adjusting the valve 18 relatively to its seat 19 or the spindle 10.

The form shown in Fig. 4 is similar to that just described except that the block 26, having the arcuate surface 27, is clamped against the bar 21 by the screw 24, thereby providing a cuneate slot at the end of the rocker 13 for the bar 21 so that the bar will be reinforced when flexed by movements toward the left as seen in Fig. 4.

In Fig. 5, a cuneate slot 28 is formed in the end of the rocker 13', the spring bar 21 snugly fitting the slot and being secured by the clamping action of the screw 29. The bar 21 in both Fig. 4 and Fig. 5 has the slot 25 to permit adjustment, as above described, but in Fig. 5 I have provided an adjusting screw 30 in the rocker, this screw bearing against the end of the bar 21 and being locked by the nuts 31.

The operation of the invention is as follows: The spindle 10 has rectilinear governing movements which are transmitted through the bar 12 to the rocker 13. If the surface 23 at the lower end of the rocker is on the same radius as the surface 15, the bar 21 will be moved endwise exactly the same distance as the spindle 10 and thus the valve 18 will have exactly the same movements as the spindle 10, except that they will be in the opposite direction. In case the radius of the surface 23 is different than that of the surface 15, the movements of the valve 18 will still be in exact proportion to the movements of the spindle 10. Adjustments of the relation of valve 18 with its seat 19, and spindle 10 are effected in the manner above described, without affecting the relation of the movements of these parts. The screw 30 in the modification illustrated in Fig. 5 has the advantage of providing for minute adjustments and also permits the valve 18 and bar 21 to be disassembled and then reassembled in exactly the same positions as they were originally.

While I have shown a leaf spring in the drawings it will be evident that springs having other cross-sections may be used, the essential features being that they are non-flexible longitudinally and flexible laterally.

It will also be readily seen and understood that while I have shown and described my invention as applied to a governing mechanism, the disclosed arrangement is not limited to such use only, but may be applied to other and similar devices, where it is desired to transmit from one member having a rectilinear movement to another member having a reciprocatory or oscillating movement whether in a rectilinear or curved path, and when one of the members moves in a curved path, one of the spring bar connections is omitted.

What I claim is:—

1. Governing mechanism comprising a valve having rectilinear movement, a controlling member also having rectilinear movement, a pivotally mounted rocker, springs flexible laterally only and secured to said valve and member so as to move endwise therewith, and means connecting said springs with said rocker.

2. Governing mechanism comprising a valve having rectilinear movement, a controlling member also having rectilinear movement, a pivotally mounted rocker, spring members non-flexible longitudinally and respectively connected to said valve and controlling member and movable endwise therewith, and means rigidly connecting said spring members with said rocker.

3. Governing mechanism comprising a valve having rectilinear movement, a controlling member also having rectilinear movement, a pivotally mounted rocker, spring members non-flexible longitudinally and respectively connected to said valve and controlling member and movable endwise therewith, means rigidly connecting said spring members with said rocker, and means permitting the adjustment of said valve relatively to said controlling member.

4. Governing mechanism comprising two elements having rectilinear movement, a pivotally mounted rocker, and spring bars rigidly connected with said elements and said rocker and whereby the movement of one of the elements is accurately transmitted through said rocker to the other element.

5. Governing mechanism comprising two elements having rectilinear movement, an intermediate rocker, spring bars rigidly connected with said elements and said rocker and means for adjusting one of the spring bar connections to change the relation of one of said elements to the other.

6. Governing mechanism comprising two elements having rectilinear movement, a pivoted intermediate rocker having arcuate surfaces formed about the rocker pivot, spring bars rigidly connected with said elements and movable endwise therewith, the line of movement of said bars being tangent to said arcuate surfaces, respectively, and means for rigidly securing said bars against said surfaces.

7. Governing mechanism comprising two elements having rectilinear movement, a pivoted intermediate rocker having arcuate surfaces formed about the rocker pivot, a spring bar rigidly connected with one of said elements and one of said surfaces and movable endwise with the said element, a spring bar rigidly connected with the other of said elements and movable endwise therewith, and adjustable connection between the last-mentioned bar and the other of said surfaces.

8. Governing mechanism comprising two elements having rectilinear movement, a pivoted intermediate rocker having arcuate surfaces formed about the rocker pivot, a spring bar rigidly connected with one of said elements and one of said surfaces and movable endwise with the said element, a spring bar rigidly connected at one end with the other of said elements and provided with a longitudinally extending slot and moving endwise with the said elements, and a screw passing through said slot and securing the last-mentioned spring bar against the other of said surfaces.

9. Governing mechanism comprising two elements having rectilinear movement, a pivoted intermediate rocker having arcuate surfaces formed about the rocker pivot, a spring bar rigidly connected with one of said elements and one of said surfaces and movable endwise with the said element, a spring bar rigidly connected at one end with the other of said elements and provided with a longitudinally extending slot and moving endwise with the said element, a screw passing through said slot and adapted to clamp the last-mentioned spring bar against the other of said surfaces, and a screw carried by said rocker and engaging the end of the last-mentioned spring bar.

10. Governing mechanism comprising two elements having rectilinear movement, a pivoted intermediate rocker having at one end an arcuate surface formed about the rocker pivot, a spring bar secured to one of said elements and movable endwise therewith and secured against said surface, said rocker having at its other end a cuneate slot with curved sides, a spring bar secured at one end to the other of said elements and movable endwise therewith and having its other end in said slot, and a screw clamping the sides of said slot on said bar.

11. Governing mechanism comprising two elements having rectilinear movement, a pivoted intermediate rocker having at one end an arcuate surface formed about the rocker pivot, a spring bar secured to one of said elements and movable endwise therewith and secured against said surface, said rocker having at its other end a cuneate slot with curved sides, a spring bar secured at one end to the other of said elements and movable endwise therewith and having its other end in said slot, a screw for clamping the sides of said slot on said bar, and an adjusting screw carried by said rocker in alinement with said slot and engaging the end of the spring bar.

12. Governing mechanism comprising two elements having simultaneous rectilinear movements in different directions, a pivoted intermediate rocker provided with oppositely arranged arcuate surfaces formed about the rocker pivot, a spring bar secured to one of said elements and moving endwise therewith and also connected with one of said surfaces, a spring bar secured to the other of said elements and moving endwise therewith, a block having an arcuate surface arranged on the last-mentioned spring bar, and means for clamping the last-mentioned spring bar between said block and the other of said arcuate surfaces on said rocker.

13. A transmission mechanism comprising an element having a rectilinear movement, a pivotally mounted rocker, and a spring bar rigidly connected with said element having rectilinear movement and one end of said rocker, whereby the movement of said element is transmitted from one end of said rocker to and in an opposite direction at the other end of the rocker.

14. A transmission mechanism comprising two elements having parallel and rectilinear movement, a pivotally mounted rocker, and spring bars rigidly connected with said elements and at opposite ends of said rocker and whereby the movements of one of the elements is accurately transmitted through said rocker to the other element in an opposite direction.

In testimony whereof, I affix my signature.

ELMER D. SPICER.

Copies of this patent may be obtained for five cents each, by addressing the "Commissioner of Patents, Washington, D. C."